United States Patent
Kleinerman

[15] 3,639,765
[45] Feb. 1, 1972

[54] INFRARED IMAGE CONVERTER
[72] Inventor: Marcos Kleinerman, Point Breeze, Webster, Mass. 01570
[22] Filed: July 1, 1969
[21] Appl. No.: 838,088

[52] U.S. Cl. .................. 250/83.3 H, 250/71 R, 252/301.2 R
[51] Int. Cl. ........................................................ G01t 1/16
[58] Field of Search .......... 250/83.3, 71, 80, 213 R, 213 VT; 313/108 R, 108 C, 108 D; 252/301.2 R

[56] References Cited

UNITED STATES PATENTS

| | | | |
|---|---|---|---|
| 2,482,815 | 9/1949 | Urbach | 250/83.3 |
| 2,989,643 | 6/1961 | Scanlon | 250/213 |
| 3,409,773 | 11/1968 | Borst | 250/83.3 |
| 2,527,365 | 10/1950 | Leverenz | 252/301.4 S |
| 2,563,472 | 8/1951 | Leverenz | 250/83.3 HP |

OTHER PUBLICATIONS

Luminescence of Inorganic Solids, Academic Press, Risdone Pp. 438–440

Primary Examiner—James W. Lawrence
Assistant Examiner—D. C. Nelms
Attorney—Lane, Aitken, Dunner & Ziems

[57] ABSTRACT

Device for converting light in the infrared portion of the spectrum into visible light based on the phenomenon of thermal quenching of visible fluorescence comprising a conversion screen which contains an ultraviolet irradiated temperature-sensitive phosphor.

19 Claims, 4 Drawing Figures

INVENTOR
MARCOS KLEINERMAN

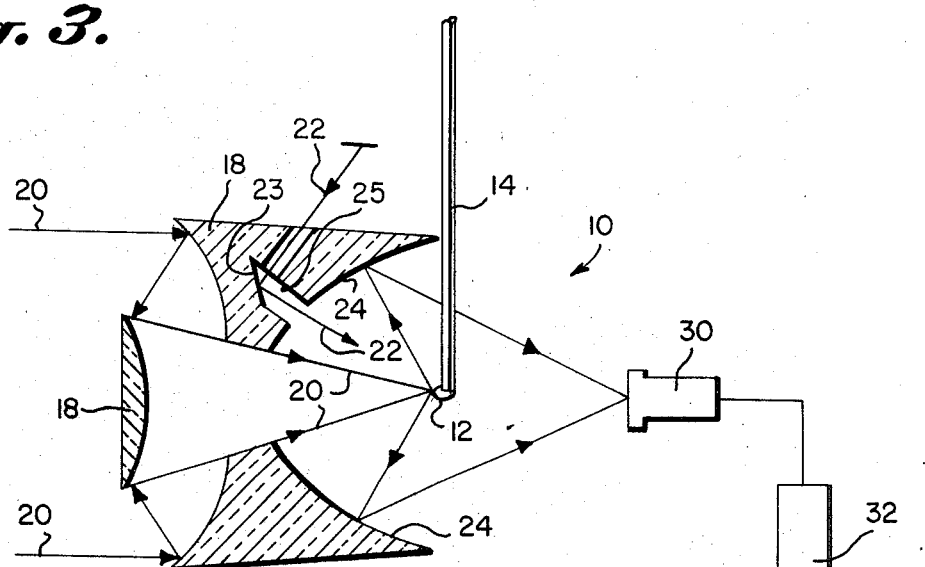
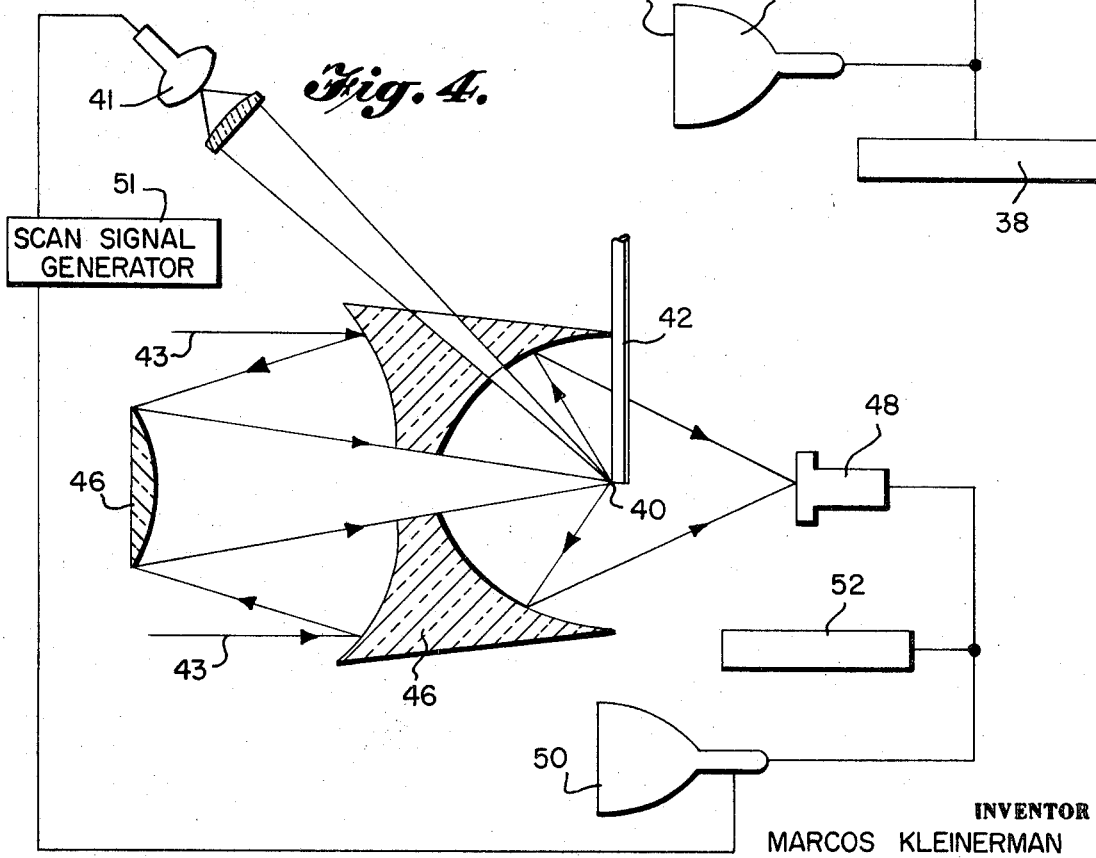

INFRARED IMAGE CONVERTER

BACKGROUND OF THE INVENTION

The field of the invention is infrared image converters. Infrared image converters based on the phenomenon of thermal quenching of visible fluorescence excited by ultraviolet radiation is known and a discussion of the principles involved can be found in an article by F. Urbach, N. R. Nail and D. Pearlman, Journal of Optical Society of America, Vol. 39, p. 1,011 (1949), the teachings of which are expressly incorporated herein by reference. This method of image conversion is known as "fluorescence thermography." Prior to the present invention, the most sensitive phosphors known and used in "fluorescence thermography" had a temperature coefficient of fluorescence intensity of 25 percent per degree centigrade at near room temperatures and because of the relatively large heat capacity of solids in this temperature region fluorescence thermography is not sensitive enough to be successfully used in an infrared projection thermography system. In such a system an infrared image is made visible by projecting the signal onto an ultraviolet irradiated temperature sensitive phosphor which forms an image from the energy of the signal.

The disadvantages of "fluorescence thermography" for infrared systems is overcome in accordance with this invention by a conversion screen of low-temperature phosphors which by thermal quenching or thermal enhancement improve the sensitivity over the prior art by about four or more orders of magnitude.

SUMMARY OF THE INVENTION

A fluorescent screen is provided of a luminescent system in which the system has two kinds of emissive centers which can be identified as A centers and B centers, which fluoresce at two different wavelengths $\lambda_1$ and $\lambda_2$, and with a high total fluorescence yield (greater than 0.1) when excited with long wavelength ultraviolet radiation. The system is chosen so that the concentration of the B centers is much smaller than that of the A centers. Thus energy transfer cannot occur efficiently from an A center to a B center except via an energy level which is higher than that of the A center.

By providing such a screen with characteristics as described below a sensitivity can be attained which is sufficient to enable the conversion of infrared light to visible light.

Accordingly, it is an object of the invention to provide an improved device for converting infrared energy to visible light.

BRIEF DESCRIPTION OF THE DRAWING

FIG. 3 is a schematic illustration of a device utilizing the conversion screen of the instant invention; and FIG. 4 is a schematic illustration of an alternate embodiment of the device shown in FIG. 3.

DESCRIPTION OF THE PREFERRED EMBODIMENTS

Figure 1:
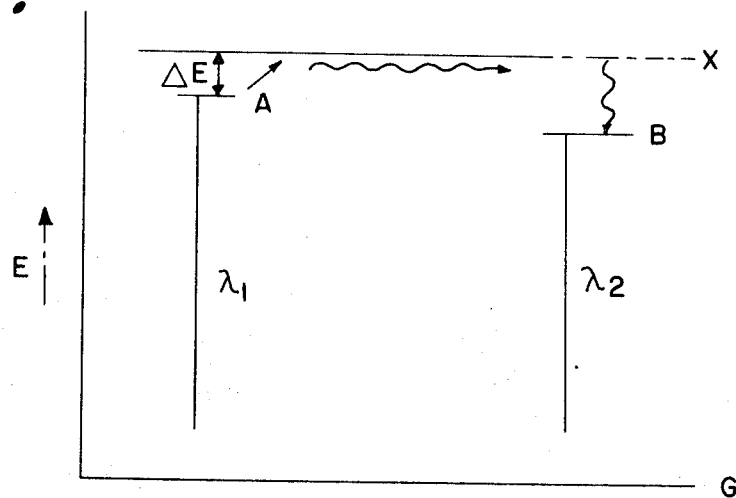
FIG. 1 is an energy level diagram of two fluorescent centers which are part of the phosphor screen of the present invention.

In the present invention, a fluorescent screen is made of a luminescent system as shown in FIG. 1, in which the system has two kinds of emissive centers which can be identified as A centers and B centers, which have a high total fluorescence at two different wavelengths $\lambda_1$ and $\lambda_2$, and with a high total fluorescence yield ($> 0.1$) when excited with long wavelength ultraviolet radiation. The system is chosen so that the concentration of the B centers is much smaller than that of the A centers. Thus energy transfer cannot occur efficiently from an A center to a B center except via an energy level X of the medium as is shown diagrammatically in FIG. 1. Level X has an energy level higher than that of the A centers by a value $v\Delta E$.

Under ultraviolet irradiation the A center levels are populated, and some of the energy migrates to the B centers which will fluoresce with an intensity $I_B$. The rate K of energy transfer from A center to B center is given by (1)  $K = C \exp(-\Delta E/kT)$ and is discussed in an article by M. Kleinerman and S. Choi. J. Chem. Phys., Vol. 49, p. 3,901 (1968), the teachings of which are herein incorporated by reference.

In the above equation, $C$ is a constant for a given sample, which depends on the concentration of B centers and that of other exciton traps, $k$ is the Boltzman constant and $T$ is the temperature in degrees Kelvin. At two different temperatures $T_1$ and $T_2$, the ratio of energy transfer efficiencies in the absence of other phenomena is:

(2)  $\dfrac{K_2}{K_1} = \dfrac{I_{B2}}{I_{B1}} = \exp\left[\dfrac{\Delta E}{k}\left(\dfrac{T_2 - T_1}{T_1 \times T_2}\right)\right]$ If $T_1$ is the temperature of the screen in the absence of incident infrared radiation, and if $\Delta E$ is equal to approximately $10kT$, a fraction of the energy from the excited A centers will be transferred to the B centers. When infrared radiation is absorbed in the screen the temperature rise at the point of incidence will increase the rate of energy transfer, and hence $I$, in accordance with eq. (2). For small temperature changes the condition $\Delta E = 10kT$ leads to:

(3)  $\Delta T = T/10 \ln T_{B2}/I_{B1}$

At $T = 4.2°$ K. eq. (3) becomes:

(4)  $\Delta T = 0.96 \log_{10} I_{B2}/I_{B1}$

The amount of heat Q absorbed from the infrared radiation needed to produce the increase $\Delta T$ in a gram mole of the phosphor is:

(5)  $Q = 0.96 \, C_p \log_{10} I_{B2}/I_{B1}$ where $C_p$ is the molar specific heat of the phosphor.

Since $C_p$ is about three orders of magnitude smaller at $T = 4.2°$ K. than at 300° K., it follows from eqs. (3) and (5) that the energy required to produce the needed ratio $I_{B2}/I_{B1}$ is about five orders of magnitude smaller at liquid helium temperatures than at 300° K.

Systems somewhat different from those described in FIG. 1, but also involving activated exciton migration, are also contemplated for infrared image conversion. The requirement is only that the systems have similar sensitivities. The following variations are possible:

Variation I. A centers luminescent; B centers nonluminescent.

Variation II. A centers nonluminescent; B centers luminescent.

Variation I offers the possibility of a significant thermal amplification effect. Thus, the quenching of the fluorescence of the A centers caused by the temperature rise $\Delta T$ will produce an additional temperature rise $\Delta_i T$ from the conversion of the fluorescence into heat.

Crystalline $Tb^{3+}$ chelates doped with $Eu^{3+}$ have been found useful in practicing the invention since with $Eu^{3+}$ doped $Tb^{3+}$ chelates, the triplet level of the ligand (the X level of FIG. 1) can be slightly above the $^5D_4$ level of $Tb^{3+}$ (the A center) so that the excitation energy can migrate to the europium ions (the B centers).

Figure 2:
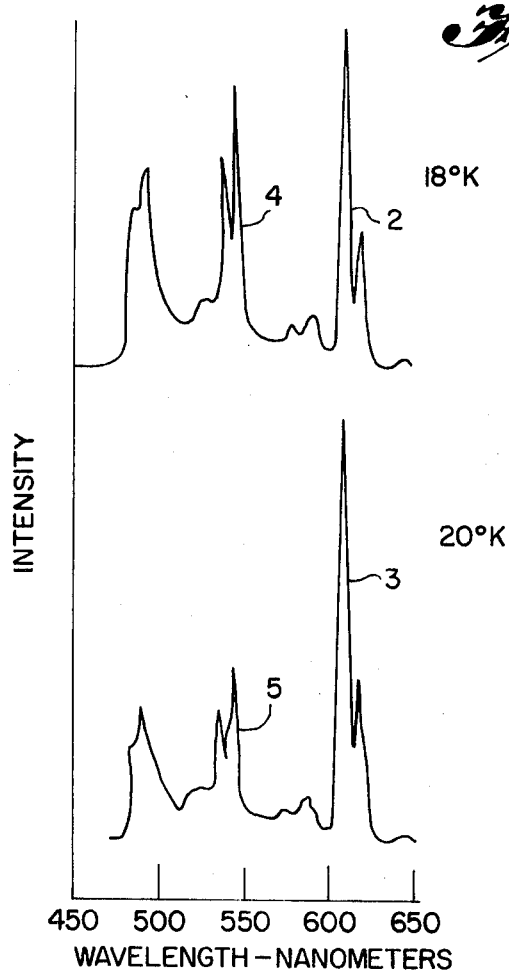
FIG. 2 is a graph of the fluorescence emissions from a phosphor of the screen of the present invention.

The behavior of one such system is illustrated in FIG. 2 where the fluorescence intensity versus wavelength in nanometers is plotted. FIG. 2 shows the total fluorescence from a phosphor having both centers A and B. The fluorescence from the $Eu^{3+}$ ion at 18° K. and 20° K. is indicated by reference numerals 2 and 3 respectively while the fluorescence from the $Tb^{3+}$ ion at 18° K. and 20° K. is indicated by reference numerals 4 and 5 respectively. The phosphor selected is the crystalline chelate terbium tetrakis [1,3 bis(p-methoxyphenyl) 1,3-propanedione] piperidine doped with 1 percent of the corresponding europium chelate. As is shown in FIG. 2, a $\Delta T$ of 2° K. has greatly reduced the fluorescence from $Tb^{3+}$ (the A centers) while increasing the fluorescence from $Eu^{3+}$ (the B centers).

Exciton transport and fluorescent emission in chelates of the type described takes place in a total time of about $10^{-3}$ seconds or less, if the $Eu^{3+}$ dopant concentration is greater than 1 percent. This speed is sufficient for most purposes because the time for electronic scanning of the image is usually longer. The time resolution will therefore be limited by the thermal relaxation time of the fluorescent screen, and this can be controlled by the extent of thermal coupling of the screen to the cold finger of the cyrogenic apparatus, which is described below.

It is preferred that systems with a high total fluorescence quantum efficiency and a value of $\Delta E$ of about 25 to 35 Kaysers be employed. Terbium chelates doped with europium or other exciton traps meet this requirement because the position of the emissive $^5D_4$ level of $Tb^{3+}$ is practically invariant upon combination of $Tb^{3+}$ with different ligands. However, the ligand which combines with $Tb^{3+}$ to form a crystalline chelate must end up with a triplet level about 25 to 35 Kaysers above the $^5D_4$ level of $Tb^{3+}$. The value of $\Delta E$ in the crystalline chelate can be determined from eq. (7) (given below). The ligands useful for practicing the invention are those with a triplet level $T_1$ within about 300 Kaysers above the $^5D_4$ level of $Tb^{3+}$, as determined from their phosphorescence spectra in a rigid organic glass. In the crystalline terbium chelate $T_1$ will be somewhat lower, due to stronger van der Waals interactions between the adjacent chelate molecules.

In FIG. 3 is shown a device for converting infrared signals to visible signals utilizing the phosphor screen of the present invention. As is shown in FIG. 3, an infrared converter 10 is comprised of screen 12 having a fluorescent layer, which layer contains a phosphor system as described above. In order to obtain the advantage of the low temperature system as has been described this screen can be affixed to conventional cold finger 14.

Collecting optics 18 such as parabolic mirrors are employed to collect an infrared image indicated by arrows 20 and focus said image onto screen 12. Screen 12 is illuminated with ultraviolet light 22 from an ultraviolet source, which light is reflected by reflector 23 through aperture 25 in mirror 24 onto said screen. As a result the fluorescent layer of the screen will fluoresce in accordance with the intensity of the incident infrared light and generate an image in the visible spectrum corresponding to the infrared image focused on the screen 12. The elliptical mirror 24 functions to focus the resulting visual image generated by the screen 12 onto image orthicon tube 30.

By the mechanism previously discussed a visible image is produced by the infrared heating of the fluorescent layer when this layer is irradiated uniformly with ultraviolet radiation. The image orthicon tube 30 generates a video signal representing the visual image focused thereon, which signal is amplified by amplifier 32 and displayed on screen 34 of cathode-ray tube 36. In the absence of any infrared light, the screen 12 will have a background luminescence, which is added to the visual image produced when an infrared image is focused on the screen 12. The portion of the video signal which results from this background luminescence is cancelled out by a bias signal generated by bias signal source 38.

Instead of displaying the image with a video system as shown in FIG. 3, the red luminescent image produced by the screen 12 can be photographed with ordinary panchromatic film through a filter that cuts out the green luminescent background.

Screen 12 can be constructed by depositing a thin layer ($>1$ micrometer) of the phosphor on a thin layer (1 or 2 $\mu$) of an absorber with a low molar heat capacity at cyrogenic temperatures. Graphite has been successfully employed as an absorber for screen 12. The temperature of cold finger 14 is preferably kept below $10°$ K. and optimally is kept at about $4.2°$ K. or lower. The thermal image on the graphite from the infrared emitting or reflecting object will thus be transferred to the phosphor layer, where it will become a visible image under ultraviolet irradiation.

In an alternate embodiment of the invention shown in FIG. 4, a flying spot scanner system is employed to display the visual image. The system is comprised of fluorescent screen 40, which screen is similar to that described in reference to FIG. 3. Fluorescent screen 40 is applied on a conventional cold finger 42. Screen 40 is scanned by a flying ultraviolet spot from flying spot scanner 41. The incoming infrared rays 43 are imaged onto said screen by collecting optic 46 similar to the collecting optic shown in FIG. 3. The resulting fluorescence which is a function of the temperature rise at the scanned spot produced by the infrared image is collected and focused on photomultiplier 48 for detection. The resulting video signal generated by photomultiplier 48 is displayed on cathode-ray tube 50 which is scanned in synchronization with the flying spot scanner as a result of receiving horizontal and vertical sync signals from a source 51 which also supplies these sync signals to the flying spot scanner. This system also includes bias signal source 52 which biases out the portion of the signal due to the background luminescence of the screen 12.

For the purpose of the calculations described below it is assumed that the process of infrared exposure and detection of the resulting visible image is shorter than the thermal relaxation time of the system.

The approximate radiant energy needed to produce a processed image can be calculated according to eq. (5) in a system using a 2 $\mu$m. thick layer of graphite with $C_p \simeq 1.2 \times 10^{-4}$ cal. mole$^{-1}$ deg.$^{-1}$ (at $4.2°$ K.) and a specific gravity of 2.2. The result is $$Q = 4.2 \times 10^{-9} \log_{10} I_{B2}/I_{B1} \text{ calories cm.}^{-2}$$
$$= 1.77 \times 10^{-8} \log_{10} I_{B2}/I_{B1} \text{ joules cm.}^{-2}$$

This is approximately equal to $8.9 \times 10^{-11}$ joules cm.$^{-2}$ for an increase in $I$ of 1 percent, and $3.7 \times 10^{-10}$ joules cm.$^{-2}$ for a 5 percent increase. The lowest percent increase needed to extract an image from the background luminescence is determined by the magnitude of the fluctuations in the number of photoelectrons produced in the photocathode of the electronic image processing device per picture element.

As an example, a system similar to the one shown in FIG. 3 which receives images produced by a $CO_2$ laser, at a wavelength $\lambda = 10.6$ microns can illustrate the theory of the present invention. If the $f$ number of the system is 1.5, the optical resolution is:

$$d = 1.22 \, \lambda f$$
$$= 19.4 \text{ micrometers}$$

Since the area per resolvable square is thus $3.76 \times 10^{-6}$ cm.$^2$ the energy required per resolvable square is:

$$q = 6.6 \times 10^{-14} \log_{10} I_{B2}/I_{B1} \text{ joules.}$$

This corresponds to $\sim 3.5 \times 10^4$ photons at the wavelength of 10.6 micrometers for a 5 percent increase and to $8.4 \times 10^3$ photons for a 1 percent increase.

The energy absorbed from the ultraviolet source can be of the same order of magnitude or even greater if it is constant within a few percent and homogeneous over the detector area. For instance, if eq. (3) is approximately obeyed in a thermal interval $\Delta T = 0.5°$ K. and one-half of the absorbed energy is dissipated as heat, it is possible to use up to about $5 \times 10^4$ ultraviolet photons of $2.6 \times 10^4$ Kaysers per photon ($\lambda = 380$ nanometers) per resolvable point if one starts at the lower end of the temperature interval.

If, for instance, the total quantum yield of fluorescence in the phosphor is 0.8, equally distributed between the A and B centers, the total number of photoelectrons produced from B at the photocathode per resolvable point in the fluorescent screen will be $2 \times 10^4 \alpha \beta$, where $\alpha$ is the fraction of the photons from B that reach the photocathode, and $\beta$ is the quantum efficiency of photoelectron production.

If $\alpha$ and $\beta$ are 0.2 and 0.1 respectively, the fluctuations in the number of photoelectrons per second will be:

(6)
$$F = \left(\frac{2 \times 10^4 \alpha \beta}{\tau}\right)^{1/2}$$
$$= \left(\frac{4 \times 10^2}{\tau}\right)^{1/2}$$

The needed percent increase of $I$ will then be smaller the shorter the exposure time for a given amount of absorbed energy. If 400 photoelectrons are ejected in 1 second, the fluctuations will be 5 percent, so that the infrared energy required per image element is greater than $1.4 \times 10^{-15}$ joules. If the same number of photoelectrons is ejected in $10^2$ seconds the fluctuations will amount to one-half of 1 percent. Then a ratio $I_{B2}/I_1=1.01$ is sufficient, with a sensitivity of $3.3 \times 10^{-16}$ joules per image element.

It is possible that only a fraction of the energy migrating away from the A centers reaches the emissive level of the B centers, the remaining excitation being trapped at impurities or other defect centers, or otherwise dissipated thermally. In such a case it may be convenient to obtain the image from the quenching of the fluorescence from the A centers. If such quenching occurs through the energy level X eq. (1) can be rewritten as:

$$(7) \quad \tau^{-1} - \tau_0^{-1} = (\alpha n_B + \alpha_1 n_I) \exp\left(-\frac{\Delta E}{kT}\right)$$

where $\tau_o$ is the radiative lifetime of the A centers; $\tau$ is the measured lifetime decreased by quenching, $n_B$ is the concentration of the B centers, $n_I$ that of the impurities and $\alpha$ and $\alpha_1$ are related to the exciton capture cross sections of the B centers and the impurities respectively.

Equation 7 may be expressed in terms of the intensity of the luminescence from the A centers, by noting that the lifetime is proportional to the intensity $I_A$:

(8) $\quad 1/I_A - 1/I_{A0} = C' \exp(-\Delta E/kT)$

At two temperatures $T_1$ and $T_2$ the following relation results:

$$(9) \quad \frac{I_{A2}(I_{A0}-I_{A1})}{I_{A1}(I_{A0}-I_{A2})} = \exp\left[-\frac{\Delta E}{k}\left(\frac{1}{T_1}-\frac{1}{T_2}\right)\right] = \frac{K_1}{K_2}.$$

where $I_{A0}$ is the intensity of the luminescence of the A centers in the absence of quenching.

While various embodiments of the invention have been described, in all instances the fluorescent screen must meet certain criteria. The material which comprises the phosphor must have a visible luminescence with a high luminescence efficiency ($> 0.1$) when populated with ultraviolet radiation or short wavelength visible light. The requirement for visible luminescence can be met either the A center, the B center or both centers. A second criteria is that $\Delta E$ be about an order of magnitude greater than $KT$ with $T$ between 2° K. and 10° k. ($K$=Kelvin). A third criteria is that the rate $K$ of energy migration away from the luminescent A center is not more than an order of magnitude different from the radiative lifetime of the A center. A fourth criteria exists if the A centers are nonluminescent, then the rate $K$ of energy migration to the luminescent B centers should not be more than an order of magnitude different from the lifetime of the A centers in the absence of the B centers.

By providing a phosphor with the above-defined characteristics the conversion of light in the infrared portion of the spectrum into visible light is obtained.

I claim:

1. An infrared image converter comprising a screen having applied thereon a phosphor, said phosphor being sensitive when irradiated with short wavelength light in a predetermined spectrum, said phosphor being comprised of a plurality of centers of two different types identified as A centers and B centers, said phosphor fluorescing in accordance with the rate of energy transfer from said A centers to said B centers when said A centers are populated, the rate of energy transfer from said A centers to said B centers depending upon the temperature of said phosphor, energy transfer from said A centers to said B centers occurring via an energy level $X$ which level $X$ has an energy level higher than that of said A centers by a value of $\Delta E$ wherein $\Delta E$ is approximately an order of magnitude greater than $kT$, $T$ being the temperature of the screen and $k$ being Boltzmann's constant, said A centers becoming populated when irradiated by short wavelengths light in said predetermined spectrum, means to focus an infrared image on said screen, and means for irradiating said screen with short wavelengths light in said predetermined spectrum.

2. An infrared image converter as recited in claim 1 wherein there is provided means to maintain said phosphor screen at a temperature of 2° K. and higher.

3. An infrared image converter as recited in claim 1 wherein one of said wavelengths is in the visible spectrum whereby said screen generates a visible image and wherein said converter further comprises means to display the resulting image.

4. An infrared image converter as recited in claim 3 wherein said means to display the resulting image comprises means to generate video signals representing said image and video display means responsive to said video signals to display the image represented by said video signals.

5. An infrared image converter as recited in claim 4 wherein said means to generate video signals comprises an image orthicon tube and means to focus said visible image generated by said screen on said image orthicon tube.

6. An infrared image converter as recited in claim 4 wherein said means to irradiate said screen with short wavelength light comprises means to scan said screen with a spot of short wavelength light and wherein said means to generate a video signal comprises a light-sensitive means positioned to detect the visible light generated by said screen as it is scanned by said spot of short wavelength light.

7. A device for converting light in the infrared portion of the spectrum into visible light comprising a conversion screen containing a phosphor wherein said phosphor is comprised of a plurality of different centers of two different types identified as A centers and B centers, which fluoresce at two different wavelengths, $\lambda_1$ and $\lambda_2$, characterized in that at least one of said centers has a visible luminescence with a luminescence efficiency $>0.1$ when populated, said A center being capable of being populated by ultraviolet radiation or short wavelength light, energy transfers from said A center to said B center occuring via an energy level $X$ which level $X$ has an energy higher than that of said A center by a value of $\Delta E$ wherein $\Delta E$ is approximately an order of magnitude greater than $kT$ where $T$ is the temperature of the screen and $k$ is the Boltzmann's constant.

8. The device as set forth in claim 7 wherein the A center is luminescent.

9. The device as set forth in claim 7 wherein both the A center and the B center are luminescent.

10. The device as set forth in claim 7 wherein the A center is nonluminescent and where the rate $K$ of energy migration to the luminescent B center is not more than an order of magnitude different from the lifetime of the A center in the absence of the B center.

11. The device as set forth in claim 7 wherein said phosphor is a crystalline $Tb^{3+}$ chelate doped with $Eu^{3+}$ ions.

12. The device as set forth in claim 11 wherein said chelate has ligands with a triplet level $T_1$ within approximately 300 Kaysers above the $^5D_4$ level of $Tb^{3+}$ as determined from the phosphorescence spectra in organic glass.

13. A phosphor consisting essentially of crystalline terbium tetrakis [1,3 bis (p-methoxyphenyl) 1,3 propanedione] piperidine doped with the corresponding europium chelate.

14. A device for converting light in the infrared portion of the spectrum into visible light comprising a conversion screen containing a phosphor comprised of a plurality of centers of two different types identified as A centers and B centers, characterized in that at least one type of said centers has a visible luminescence with a luminescence efficiency greater than 0.1 when populated, said A centers being capable of being populated by short wavelength type light, and with an energy transfer from said A centers to said B centers which occurs via an energy level $X$ which level $X$ is an energy higher than that of said A centers by a value of $\Delta E$ wherein $\Delta E$ is approximately an order of magnitude greater than $kT$, where $T$ is the temperature of the screen in degrees Kelvin, said temperature being not higher than 10° K., and $k$ is the Boltzmann constant, with said energy transfer occurring with a rate $K$ which is not more than an order of magnitude different from the lifetime of the A centers in the absence of the B centers, and obeying the relation $$K = C \exp(-\Delta E/kT)$$

where $C$ is a constant for a given screen.

15. The device set forth in claim 14 wherein the A centers are luminescent, and wherein the incident infrared radiation quenches the luminescence of said A centers by an amount equal to the difference $I_A - I_A$, where $I_A$ and $I_A$ are the luminescence intensities at the absolute temperatures $T_2$ and $T_1$ respectively, said intensities obeying the relation $$\frac{I_{A_2}(I_{A_0} - I_{A_1})}{I_{A_1}(I_{A_0} - I_{A_2})} = \exp\left[-\frac{\Delta E}{k}\left(\frac{1}{T_1} - \frac{1}{T_2}\right)\right]$$

where $I_A$ is the intensity of the luminescence of the A centers in the absence of quenching.

16. The device set forth in claim 14 comprising a conversion screen consisting of:
A. a layer of infrared absorbing material, and
B. a layer of temperature sensitive phosphor deposited on said layer of infrared absorbing material.

17. The device set forth in claim 14 comprising a means for excitation of the conversion screen with short-wavelength-type visible light, and a means for converting the signal resulting from the infrared heating of the screen into a video signal.

18. A device for converting light in the infrared portion of the spectrum into visible light comprising a conversion screen containing a phosphor wherein said phosphor is comprised of a plurality of different centers of two different types identified as A centers and B centers, which fluoresce at two different wavelengths, $\lambda_1$ and $\lambda_2$, characterized in that at least one of said centers has a visible luminescence with a luminescence efficiency $> 0.1$ when populated, said A center being capable of being populated by ultraviolet radiation or short wavelength light, energy transfers from said A center to said B center occurring via an energy level $x$ which level $x$ has an energy higher than that of said A center by a value of $\Delta E$ wherein $\Delta E$ is approximately an order of magnitude greater than $kT$ where $T$ is the temperature of the screen and $k$ is the Boltzmann's constant wherein said phosphor is crystalline terbium tetrakis [1,3 bis (p-methoxyphenyl) 1,3 propanedione] piperidine doped with the corresponding europium chelate.

19. The device as set forth in claim 18 wherein said screen contains a layer of graphite.

* * * * *